June 12, 1945.  J. NUNES-VAZ  2,378,094

METAL BORING OR CUTTING TOOL

Filed June 18, 1943

Inventor:
Jacobus Nunes-Vaz
by A.J.S. Dennison
atty.

Patented June 12, 1945

2,378,094

UNITED STATES PATENT OFFICE 2,378,094

METAL BORING OR CUTTING TOOL

Jacobus Nunes-Vaz, Toronto, Ontario, Canada, assignor to Dominion Diamond Cutting Company, Toronto, Ontario, Canada Application June 18, 1943, Serial No. 491,425

3 Claims. (Cl. 29—96)

This invention relates to improvements in tools for cutting metals and particularly tools having diamonds or other jewel cutting portions, and the principal object of the invention is to provide a tool in which the cutting point may be very quickly adjusted so as to present a sharp cutting edge.

A further object is to provide a holder for a poly-faceted cutting jewel which will hold the jewel securely and in proper cutting location with any one of the facet angles or points extending in cutting relation with the holder.

A still further object is to devise a cutter which will enable the rapid adjustment of the cutting jewel to present any one of the cutting points in an advanced disposition to present same in cutting relation to the metal to be machined.

In the accompanying drawing

In the art of machining metal many different forms of holders for cutting tools have been devised and such tools have been clamped or otherwise rigidly secured in an adjustable manner, and cutting tools using diamonds or other jewels have been used, but in the latter cases, that is, jewel-cutting tools, the jewels are permanently fixed in holders.

It is the purpose of this invention to provide a holder and jewels to form a cutting edge which will provide a cutter which may be very readily adjusted to present a fresh cutting edge or point when the edge in use becomes dull, so that the operator of the machine for forming the cutting operation may have a multiple arrangement of cutting members instantly available.

Figure 1:
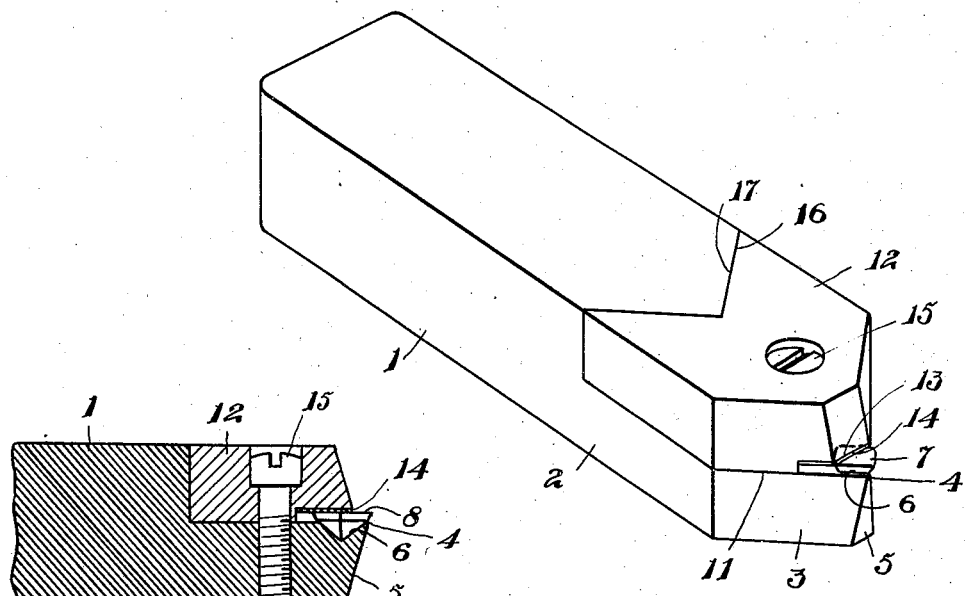
Figure 1 is a perspective view of a metal-cutting tool equipped with my improved cutting jewel.
Figure 2:
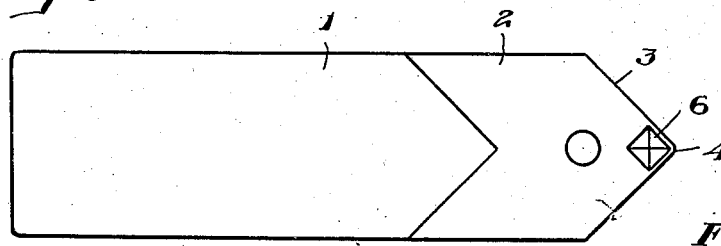
Figure 2 is a longitudinal vertical midsection through the cutting tool illustrated in Figure 1 illustrating the manner of holding and seating the jewel in its operative position.
Figure 3:
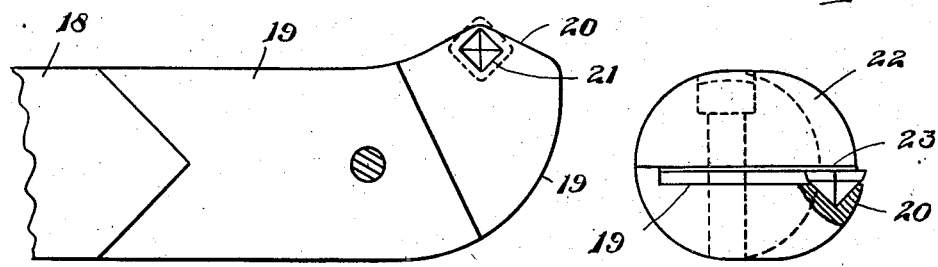
Figure 3 is a plan view of the lower portion of the cutting tool as shown in Figure 1 and illustrating the holding socket for the jewel cutter.

In the form of the invention illustrated in Figures 2 and 3, the main body 1 of the tool is preferably provided with an offset portion 2 of a lesser depth than the main body, and the extending end of the offset portion is formed with converging walls 3 extending to a slightly rounded point 4, which is preferably undercut, as indicated by the numeral 5 in Figures 1 and 2.

In the upper face of the offset portion 2 there is formed a socket 6, which is shown square with one of its diagonals arranged closely adjacent to the rounded point 4 of the holder. This socket may be shaped in any desirable shape in accordance with the number of sides or facets of the jewel to be held therein, or, if a round jewel is used the socket will be of circular form.

The diamond or other cutting jewel 7, illustrated in Figures 1, 2, 6 and 7, has a square upper surface 8, and the side walls 9 extending downwardly from the upper surface 8 are bevelled inwardly. The side walls 9 are preferably bevelled at approximately an angle of from 80° to 85°, and the top surface and bevelled edge 8 are lapped, so that a fine cutting edge is formed, the corners being rounded slightly on a radius of approximately .020 inch.

The portion of the jewel extending below the lapped edge 9 converges inwardly to a point presenting the facets 10 which converge inwardly from the side walls of the jewel. These facets conform to the tapered walls of the sockets 6 formed in the holder 1, so that the point of the tapered jewel when fitted into the socket will bring the facets into close engaging contact with the flat convergent walls of the socket.

The jewel is thus held securely from rotation in the socket.

The jewel when thus placed in position extends upwardly above the upper face 11 of the offset end 2, and it is held firmly in position by a block 12 which fits into the recess portion of the block 1, and this block 12 is formed with an upwardly offset undersurface 13 which is parallel with the top face of the offset portion 2, and such undersurface 13 is preferably lined with a silver solder inlay 14 which engages the flat top surface of the jewel 7.

The block 12 is firmly secured in clamping contact to hold the jewel in position by means of a cap screw 15 extending through the block 12 and threaded into the lower portion 2 of the holder 1. The inward end of the block 12 is preferably formed with a V-shaped notch 16 engaging a correspondingly shaped portion 17 extending above the offset 2.

It will be seen, particularly on reference to Figures 1 and 2, that the jewel 7 resting in the socket 6 is clamped securely in position with the bevelled edge 9 projecting slightly forward of the upper portion of the undercut nose end 5, thus presenting one of the rounded corners of the jewel in an extended position beyond the tool to engage the surface of the metal to be cut.

The jewel when thus placed is rigidly held and it is firmly supported on its underside by the contact of its faceted undersurface with the correspondingly shaped faces of the recess.

When the cutting edge of the jewel becomes dulled it is merely necessary for the operator to loosen the screw 15 sufficiently to allow the jewel to be lifted upwardly a sufficient distance to enable it to be turned in the socket until another corner is brought into the forward cutting position. Then by simply tightening the screw 15 the jewel is again held rigidly in position and ready to resume cutting operation.

Figures 6, 7, 8, 9:
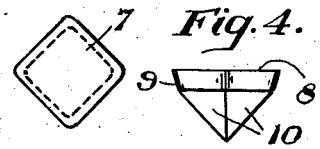
Figure 6 is an enlarged top plan view of a rectangular-cutting jewel.
Figure 7 is a side elevational view of the cutting jewel illustrated in Figure 6.
Figure 8 is a top plan view of a cutting jewel of circular form.
Figure 9 is a top plan view of a hexagonal-shaped cutting jewel.

It will be understood that the jewels may be shaped with any desired number of sides so as to present a multiplicity of cutting corners. Figure 9 illustrates hexagonal shaped jewel. It may however be found desirable for certain classes of work to use a circular-cut jewel, such as illustrated in Figure 8. This jewel will have a tapered underbody corresponding with the tapering illustrated in Figure 7, and the socket in the jewel holder will be round and permit the jewel to be turned any desired number of degrees to present a fresh cutting edge to the work.

Figures 4, 5:
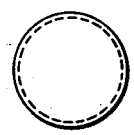
Figure 4 is a plan view of the lower section of a boring tool constructed in accordance with this invention illustrating the position of the jewel cutter in dotted lines.
Figure 5 is an end elevation and part sectional view of the tool illustrated in Figure 3 with the jewel-holding member in place.

This invention may be applied to a boring tool as readily as to an outside cutting tool and a form of such a boring tool is illustrated in Figures 4 and 5.

The member 18 is shown as of circular cross section and it is provided with an offset portion 19 similar to the offset illustrated in Figures 1 and 2, and the forward end of the bar member is provided with a lateral triangular extension 20 which extends beyond the perimeter of the bar 18. This lateral extension is formed with a socket 21 preferably arranged with one of its diagonals in right angular relation to the axis of the bar member 18 and extending close to the apex of the triangular extension 20.

An angular-shaped diamond or other cutting jewel similar to those described may be placed in the socket 21 and it is held in position by a block 22 which fits over the offset portion 19 provided with a silver solder liner 23, similar to the liner 13.

It will be seen that a boring tool such as described presents a cutting edge or angle of a diamond or other cutting jewel which projects beyond the metal holder so as to come into contact with a metal surface to be machined, which metal surface is arranged substantially parallel with the bar 18 of the holder.

Any of the different shapes of cutting jewels previously described may be adapted to a boring tool such as described.

It will be understood that cutting jewels may be readily removed from the holder to be resurfaced and sharpened by the usual lapping operation, and a tool such as described will enable the operator to make very rapid changes, thus effecting a considerable saving of time and always ensuring having spare tools or spare cutters or cutting edges availble.

What I claim as my invention is:

1. A metal cutting tool comprising a bar having a poly-faced pyramidal tapering socket formed therein adjacent to one edge with its axis perpendicular to the face of said bar and the long diameter arranged at equal angles to the adjacent edge, a jewel having a flat top and a bevelled cutting edge and a poly-faced pyramidal convergent bottom having its facets formed at a corresponding angle to fit into and engage the faces of the poly-faced socket to hold the jewel rigidly from rotational movement, and a block detachably secured to said bar and engaging the top face of said cutting jewel and clamping said jewel rigidly within said socket.

2. A metal cutting tool comprising a bar having a tapered projection, a poly-faced socket formed in the top side of the tapered end of said bar with one of its angles aligned with the point of the tapered projection, a cutting jewel having a poly-faced tapering pyramidal bottom formed with tapering facets adapted to fit snugly into and engage the tapering faces of said socket to present a flat surface engagement arranged in abutting angular relation to the lines of force applied to the cutting edge when the tool is in operation, said jewel having a flat top and bevelled edges forming a plurality of cutting edges, a block fitted on top of said bar and overlapping a portion of said jewel and engaging in clamping engagement with the top surface thereof and holding said jewel rigidly in said socket, and means for detachably securing said block to said bar.

3. A metal cutting tool comprising a bar having a triangular-shaped projection, a poly-faced socket formed in the upper face of said projection and arranged with one of its angles closely adjacent to the outward apex of said projection, a jewel having a poly-faced bottom tapered to fit said tapered socket and having the portions above said tapered portion bevelled upwardly to a flat surface forming cutting edges, a block detachably secured to said bar adapted to extend over the flat top surface of said cutting jewel and to engage same in locking contact, a liner of silver solder secured to the under face of said block to engage the top face of said jewel, and a screw securing said block to said bar.

JACOBUS NUNES-VAZ.